United States Patent [19]

Edwards et al.

[11] Patent Number: 4,681,501
[45] Date of Patent: Jul. 21, 1987

[54] ARTICLE TRANSFER APPARATUS

[76] Inventors: Samuel H. Edwards; James A. Edwards, both of Aden Road, Enfield, Middlesex EN3 7SX, United Kingdom

[21] Appl. No.: 885,183

[22] Filed: Aug. 28, 1986

Related U.S. Application Data

[63] Continuation-in-part of Ser. No. 796,218, Nov. 8, 1985, abandoned, which is a continuation of Ser. No. 538,814, Oct. 5, 1983, abandoned.

[30] Foreign Application Priority Data

Oct. 12, 1982 [GB] United Kingdom ................ 8229050
Aug. 2, 1983 [GB] United Kingdom ................ 8320779

[51] Int. Cl.⁴ .......................................... B65G 57/18
[52] U.S. Cl. .................................... 414/42; 271/191;
414/77; 414/82
[58] Field of Search ................ 414/30, 42, 56, 77, 414/82, 83, 84; 271/67, 73, 191

[56] References Cited

U.S. PATENT DOCUMENTS

| | | | |
|---|---|---|---|
| 674,262 | 5/1901 | Duncan et al. | 414/42 X |
| 1,556,695 | 10/1925 | Kronborg | 414/83 X |
| 3,079,014 | 2/1963 | Fredriksson | 414/82 |
| 3,154,201 | 10/1964 | Busch | 414/83 |
| 3,281,146 | 10/1966 | Bridge | 414/77 X |
| 3,567,047 | 3/1971 | Clausen et al. | 414/77 X |
| 4,043,459 | 8/1977 | Moreau | 414/82 X |
| 4,151,906 | 5/1979 | Pfeiffer et al. | 271/191 X |
| 4,324,520 | 4/1982 | Kjellberg | 414/42 |

FOREIGN PATENT DOCUMENTS 2219541 10/1973 Fed. Rep. of Germany ........ 414/30

Primary Examiner—Leslie J. Paperner
Attorney, Agent, or Firm—Wegner & Bretschneider

[57] ABSTRACT

The present invention provides an apparatus for transferring articles, preferably extruded aluminium sections from a first station to a second station, comprising a conveyor for receiving such articles from the first station, the conveyor being extendible and retractable in the direction of conveyance and being movable, from a first position to a second position, the second position being above the location of the second station. Displacement of the conveyor is effected by an air cylinder arrangement and displacement the conveyor is effected by an appropriate motor.

1 Claim, 7 Drawing Figures

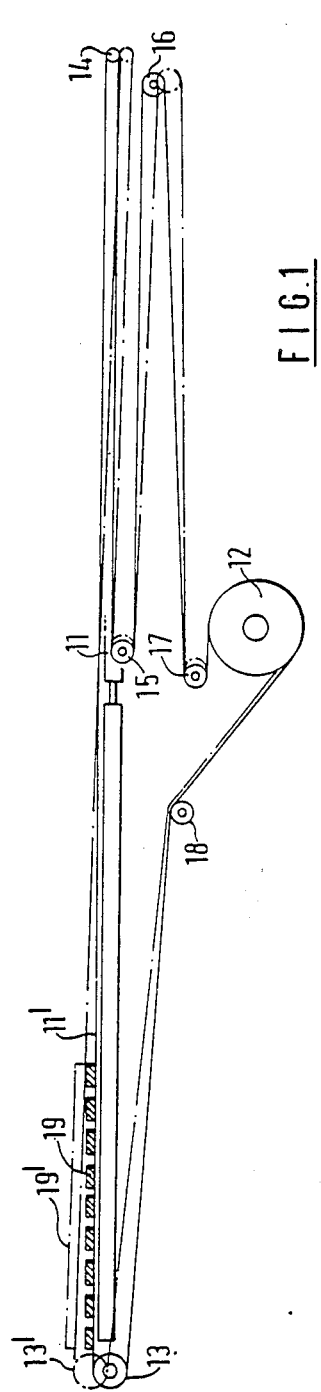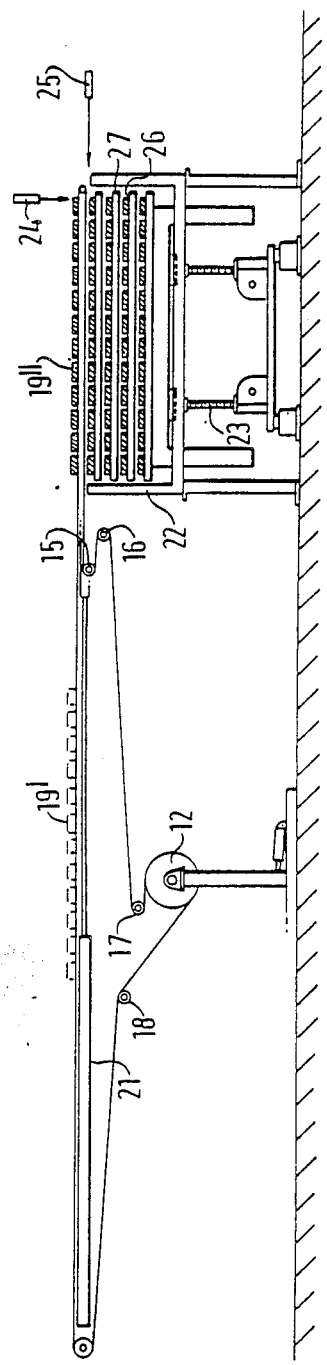

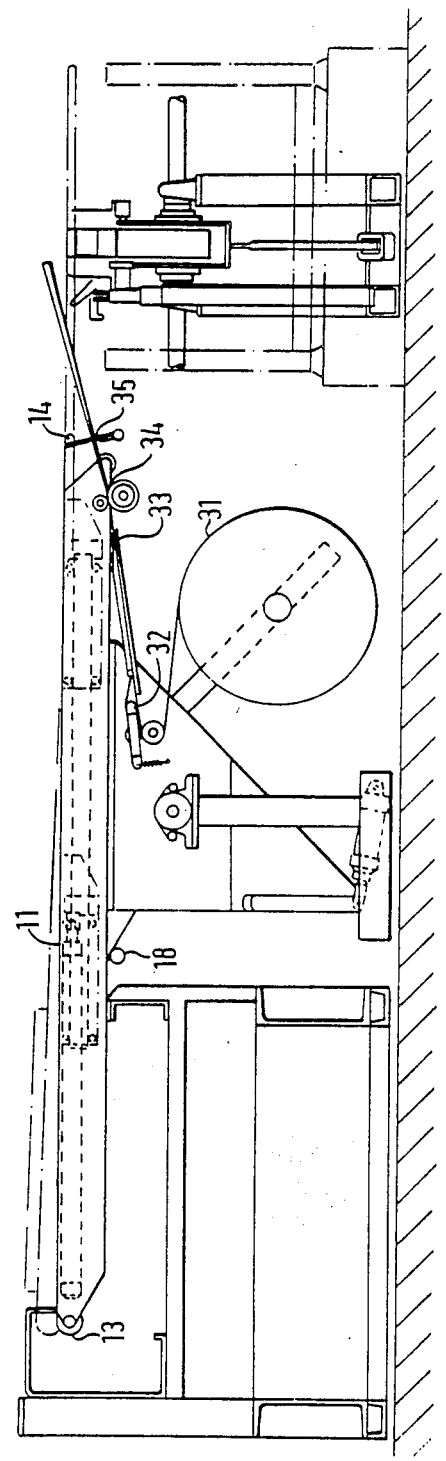

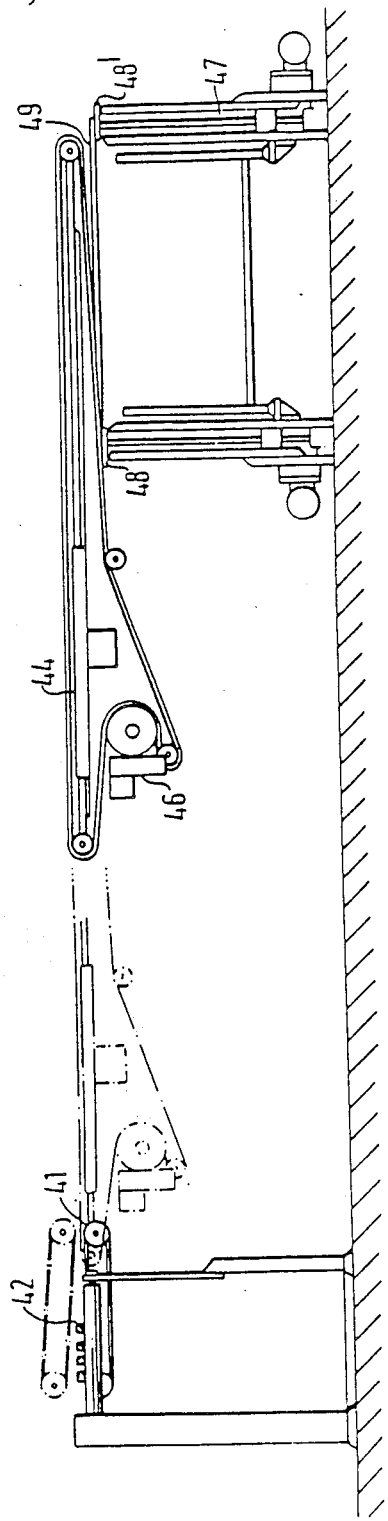

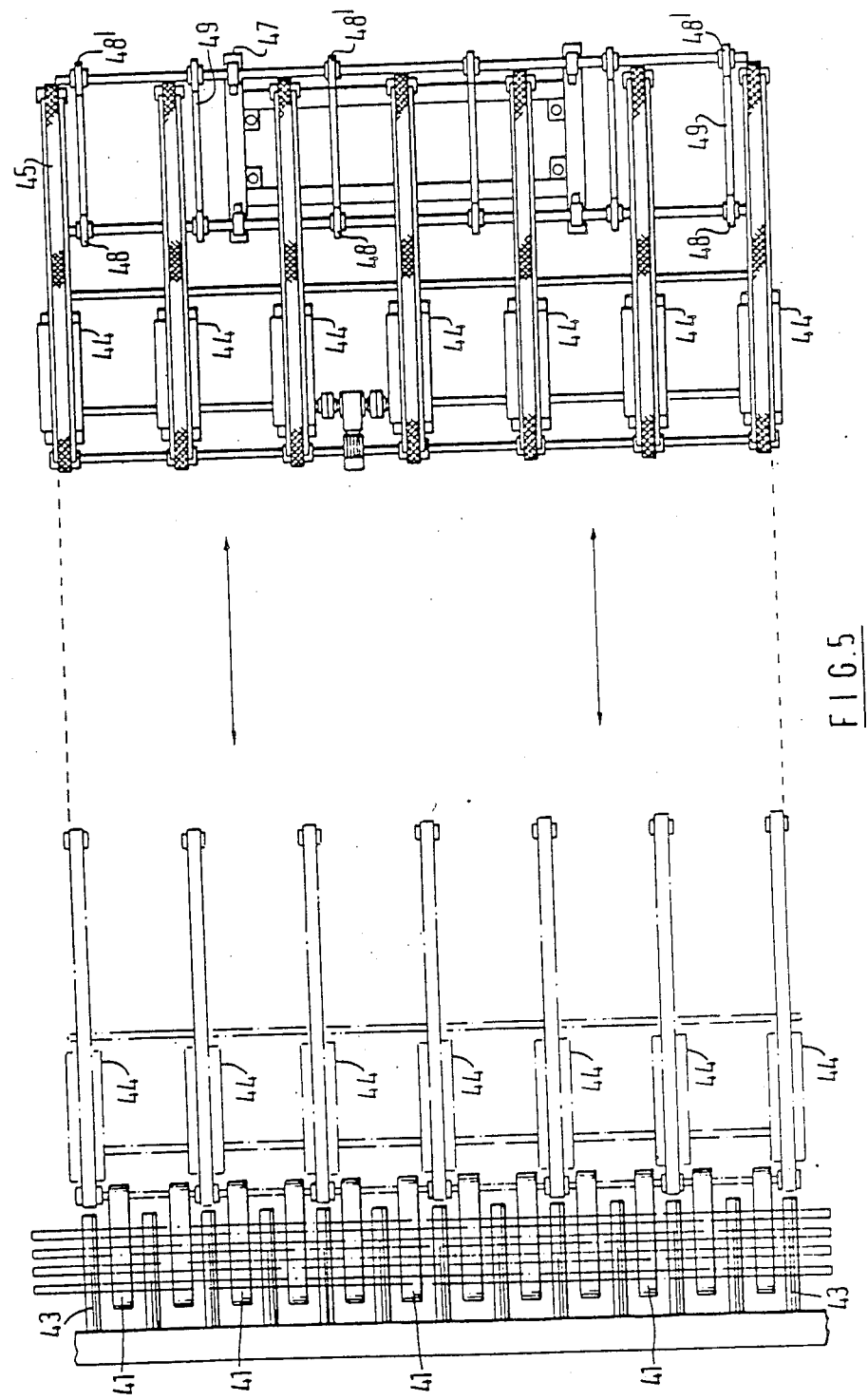

ARTICLE TRANSFER APPARATUS

This application is a continuation-in-part of U.S. Ser. No. 796,218, filed Nov. 8, 1985, now abandoned, which in turn is a continuation of U.S. Ser. No. 538,814, filed Oct. 5, 1983, now abandoned.

The present invention concerns improvements in or relating to the transfer of articles from one station to another. The invention is particularly concerned with the transfer of extruded aluminium profiles or sections from a roller conveyor on which the profiles have been cut to a preselected length to a skip in which the profiles are to be transported for subsequent treatment, e.g., anodizing.

Heretobefore, extruded aluminium profiles or sections, after emanating from an extrusion press, are conveyed by means of a roller conveyor and are clamped and then cut off to preselected lengths, generally of the order of 7 to 10 meters. A transfer apparatus is known comprising a plurality of belt conveyors which extend between the rollers of the roller conveyor and laterally convey the cut extruded sections off from the roller conveyor. The roller conveyor is then restarted and a further plurality of extruded aluminium sections are cut to preselected lengths. The sections already transferred off from the roller conveyor then have to be transferred to a skip for subsequent treatment. Such transfer can be effected manually by two operators, one at each end of the aluminium sections which are then lifted into the skip. This transfer operation is repeated several times until the skip is full, the layers of extruded aluminium sections being separated from one another by spacers.

It is an object of the present invention to provide an article transfer apparatus which, in the case of transfer of extruded aluminium sections, enables such sections to be transferred to the skip automatically without requiring the assistance of operators to lift the sections.

An extremely costly transfer apparatus is available whereby the extruded sections after being transferred off from the roller conveyor are transported, by a series of complex and expensive arrangements to the skip. Such arrangements, in view of the substantial costs involved, do not comprise an economic way of achieving transfer of articles from one station to another. Accordingly, it is a further object of the present invention to provide an article transfer apparatus which does not involve substantial costs.

We have surprisingly developed two techniques whereby the conveyor means utilized for receiving articles from a first station is also utilized for transferring such articles to a second station.

According to the present invention there is provided an apparatus for transferring articles, preferably extruded aluminium sections, from a first station to a second station comprising conveyor means for receiving such articles from the first station, said conveyor means being displaceable from a first position to a second position, said second position being above the location of the second station.

Displacement of the conveyor means may be effected either by the conveyor means being extendible and retractable in the direction of conveyance or by the conveyor means being movable.

According to a first aspect of the present invention there is provided an apparatus for transferring articles from a first station to a second station comprising conveyor means having a first portion for receiving articles from the first station and a second portion which is extendible and retractable in the direction of conveyance, and means for extending and retracting said second portion so as to permit articles to be transferred to the second station when said extendible portion is in the extended position.

According to a second aspect of the present invention there is provided an apparatus for transferring articles from a first station to a second station comprising a first conveyor means for receiving articles from the first station, a second conveyor means for receiving the articles from said first conveyor means, said second conveyor means being movable from a first position to a second position, such second position being above the location of the second station.

In a preferred embodiment of such second aspect, the second station is in the form of a container or skip and associated therewith are a plurality of means for supporting spacers so that a number of extrusions can be stacked one above the other in the container or skip.

The present invention will now be further described in relation to the transfer of extruded aluminium sections from a roller conveyor on which the sections have been cut to a skip in which the sections are to be transported for subsequent treatment. However, it is to be understood that the present invention is also applicable to the transfer in general of articles from one station to another.

It will thus be seen that in an embodiment of the first aspect of the invention there is provided apparatus for transferring a plurality of aluminium extrusion profiles from a roller conveyor on which the profiles have been cut to a preselected length to a container or skip in which the profiles are to be transported for subsequent treatment, comprising conveyor means in the form of a plurality of conveyors, a portion of each of said conveyors being locatable, in use, between the rollers of the roller conveyor, a portion of each of the plurality of conveyors being extendible and retractable in the direction of conveyance, and in said extended position being locatable above said container or skip and including means for extending and retracting each of said plurality of conveyors.

In a preferred embodiment, the conveyor means comprise a plurality of endless belt conveyors although it is to be understood that other types of conveyor means, e.g., rollers or chains, could also be used. The means for extending and retracting said conveyors preferably comprises an air cylinder arrangement. When moving the conveyors from a extended position to a retracted position, the individual conveyors of the plurality of conveyors are moved in a predetermined manner so that the extrusions will be correctly located on spacers provided in the skip.

In a particularly preferred embodiment the endless belt conveyor passes around rollers or other smooth surfaces.

The second aspect of the invention provides an alternative manner in which to transfer cut extruded aluminium profiles or sections from a roller conveyor to a skip for stacking the cut extruded aluminium profiles or sections.

Whilst the specific embodiments disclosed in such first aspect have proved successful in various applications, we have found that an economic apparatus can be manufactured which is particularly useful for use with open sided skips, although it is to be understood that the apparatus of the present invention can also be used with closed sided skips. Accordingly, rather than make the conveyor means extendible and retractable, we arrange for the conveyor itself to be moved from one position to another. Furthermore, we have provided a modified spacer arrangement system for use with the skip. The term "skip" as used in the application is known in the extrusion art as relating to frame members, either open-sided or closed-sided, for transporting extrusions or profiles.

It will thus be seen that in an embodiment of the second aspect of the present invention there is provided an apparatus for transferring a plurality of aluminium extrusion profiles from a roller conveyor on which the profiles have been cut to a preselected length to a container or skip in which the profiles are to be transported for subsequent treatment, comprising conveyor means in the form of a plurality of first conveyors, said first conveyors being locatable, in use, between the rollers of the roller conveyor, a plurality of second conveyors being movable from a first position in which the plurality of second conveyors can receive profiles from the plurality of first conveyors to a second position above the container or skip into which the profiles are to be stacked, and a plurality of pairs of support members being associated with the skip or container, each pair of support members being capable of supporting a spacer member therebetween.

In a preferred embodiment, each of the plurality of first and second conveyors comprise endless belt conveyors although it is to be understood that other types of conveyor means, e.g., rollers or chains, could also be used. The plurality of second conveyors can be moved from said first position to said second position by means of appropriate motor means associated with each conveyor.

Operation of an article transfer apparatus in accordance with the second aspect of the present invention will firstly be described in relation to an open-sided skip and secondly with a closed-sided skip.

In use, each of the plurality of first conveyors is located between the rollers of a roller conveyor on which extruded aluminium profiles or sections have been cut to length. In order to transfer the extrusions from the roller conveyor onto the plurality of second conveyors, one end of each of the plurality of first conveyors is upwardly displaced whereby the profiles are lifted off the roller conveyor and, by operation of the plurality of first conveyors, such profiles are transferred to one end of the plurality of second conveyors. Such plurality of second conveyors are then put into operation so that the profiles can be moved to the other end of the plurality of second conveyors. When the profiles are in such position, operation of the plurality of second conveyors is stopped. This method of operation permits the profiles to be located at one end of the plurality of second conveyors and means that a further number of profiles can then be introduced from the plurality of first conveyors to the plurality of second conveyors in order that any desired number of profiles can be provided on the plurality of second conveyors, depending on the size of the skips being utilized.

Once the plurality of second conveyors are appropriately loaded, then such conveyors are moved to a position such that the extruded aluminium profiles are located directly over the skip into which they are to be stacked. Associated with such skip is a plurality of pairs of support or finger members, each pair of support members having a spacer supported therebetween. The support members are caused to move upwardly so that the spacer associated therewith come into contact with the extruded aluminium profiles. Once the extruded profiles have been lifted just above the level of the plurality of second conveyors, such conveyors are then moved in the reverse direction to their original position. Once such operation has been completed the support members are then moved downwardly so that the spacer members and extruded aluminium profiles also move downwardly. When the spacer members contact either the base of the skip or a layer of aluminium sections already stacked, movement of the support members is stopped. The support members are then moved downwardly so that the associated spacers become disengaged therefrom and the extruded aluminium profiles are correctly stacked. Thereafter, the support members are moved upwardly and inwardly to their original position for the next set of aluminium profiles to be supplied from the plurality of second conveyors.

If the skip is not open-sided but closed-sided, then a modified procedure is adopted wherein once the aluminium profiles are located above the skip then the plurality of support members having spacers associated therewith move upwardly to lift the aluminium profiles off the plurality of second conveyors. The plurality of second conveyors are then moved back to their original position. It is impossible for the support members to drop below the height of the closed skip due to the side walls thereof. Accordingly, lifting means are provided inside the skip which will move upwardly and contact the underside of the spacer members. Once such contact is made, the plurality of pairs of support members move outwardly and the lifting means provided in the skip is allowed to move downwardly with associated spacer members and the aluminium profiles. The support members then move down slightly and inwardly. In operation, the support members will be located offset from and just below the level of the top belt of each of the plurality of second conveyors.

It will thus be seen that the apparatus in accordance with this second aspect of the invention enables extruded aluminium profiles to be transferred from a roller conveyor to a skip in a predetermined manner and the plurality of aluminium profiles are stacked one upon the other in the skip. When the skip is full, it is moved off for further treatment and fresh skip is inserted in its place.

It is to be understood that the apparatus in accordance with this second aspect of the invention can also be utilized in reverse to act as a destacker for a loaded skip.

The present invention will be further illustrated, by way of example, with reference to the accompanying drawings, in which:

FIG. 1 is a schematic side view of part of a transfer apparatus in accordance with the first aspect of the invention, showing a single conveyor in its retracted position;

FIG. 2 is schematic view similar to that of FIG. 1 but showing the conveyor in its extended position located over a skip;

FIG. 3 is a schematic side view of a means for automatically introducing spacers between the layers of extruded aluminium sections;

FIG. 3a shows the various shapes assumed by a cardboard spacer as it passes through the apparatus illustrated in FIG. 3;

Figure 6:
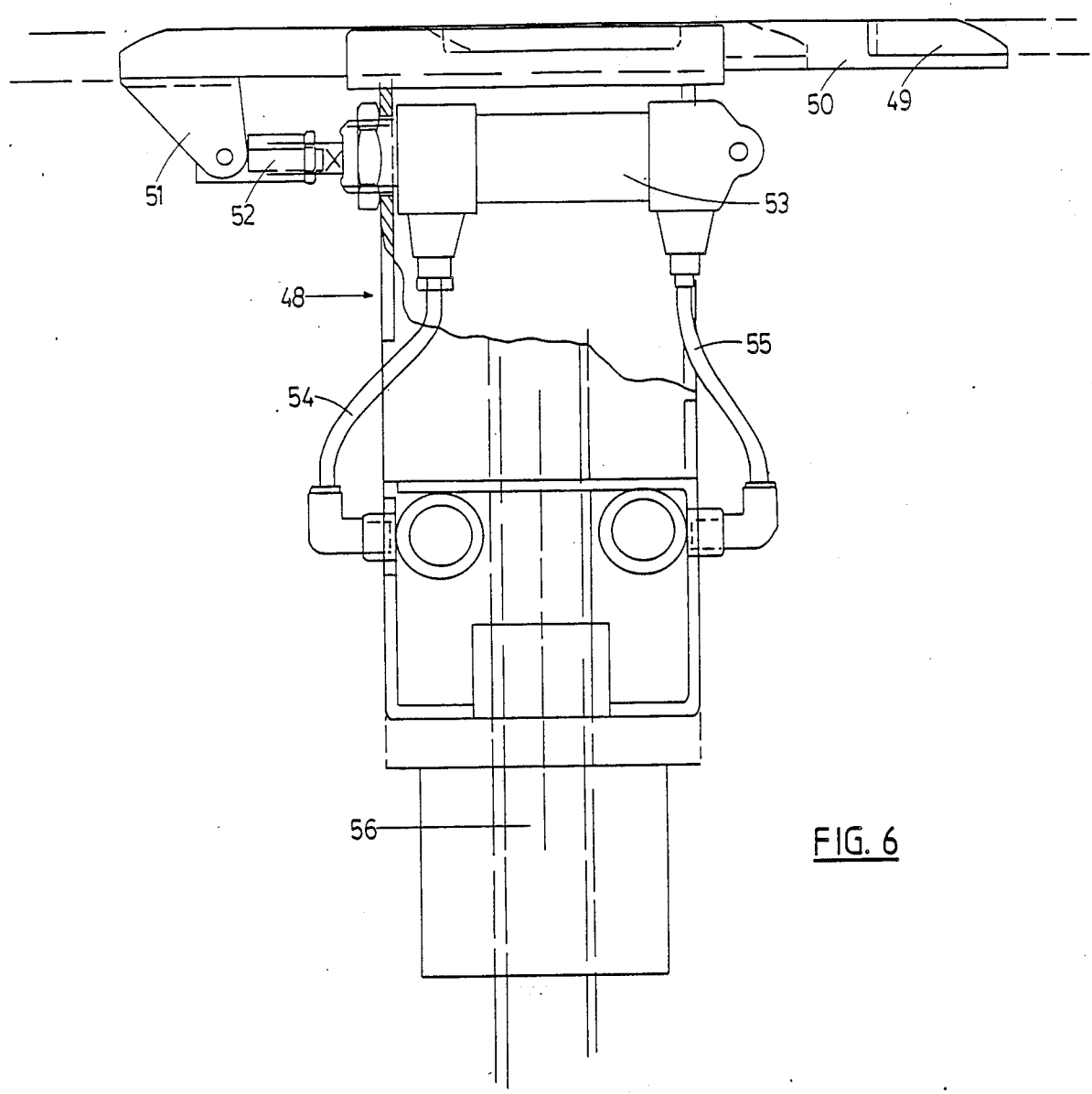

FIG. 4 schematically indicates a transfer apparatus in accordance with the second aspect of the present invention showing only a single first conveyor, a single second conveyor and a single pair of support members;

FIG. 5 schematically indicates, in plan view, a plurality of first conveyor, second conveyor, and pairs of support members; and FIG. 6 shows in detail the structure of the support members.

The apparatus illustrated in FIG. 1 shows a single conveyor in the form of an endless belt and it is to be understood that a plurality of such conveyors are utilized in the transfer apparatus of the first aspect of the present invention. Each belt conveyor 11 is driven by a motor arrangement 12 and runs around a plurality of rollers 13, 14, 15, 16, 17, and 18. Each belt conveyor 11 in its region 11' is located between the rollers of the roller conveyor on which extruded aluminium sections 19 have been cut to length. In order to transfer the extrusions 19 from the roller conveyor onto the belt conveyor 11, the extrusions 19 are lifted off the roller conveyor by upward displacement of the roller 13 of the transfer apparatus to position 13' as shown in dot-dash lines. The extrusions then adopt the position indicated by 19'. The conveyor then commences to operate in a clockwise direction and the extrusions 19 are removed from off the roller conveyor.

Such extrusions 19' then move to the position as illustrated in FIG. 2. In order to extend the length of the conveyor 11 in the direction of conveyance, an air cylinder 21 is brought into operation which acts on roller 15 and extends the conveyor 11 to the position illustrated in FIG. 2. In such extended position, and by continuous operation of the conveyor 11, the extrusions are moved to position as shown at 19". In such extended position, the profiles 19" are located above a skip 22. The height of the skip is adjusted by four motor-driven synchronized jacks 23. Such arrangement ensures that the level of the height of the skip can be adjusted accurately.

A photoelectric cell 24 is utilized to sense the lead edge of each conveyor in its extended position and stops the belt drive. A photoelectric cell 25 senses the top of the stack of extrusions as the height of the stack of profiles or sections is increased and stops the rise thereof in the correct position.

As illustrated in FIG. 2, a plurality of layers of extrusions 26 are spaced from one another by spacers 27. In the extended position as illustrated in FIG. 2, a plurality of spacers 27 would be located transverse to the longitudinal direction of the layer of profiles 26 located directly beneath the extended portion of the conveyor 11. Each conveyor is then retracted and the layer of profiles 19" rest on the spacers 27 as the conveyor 11 retracts.

It will be appreciated that the number of conveyors making up the transfer apparatus of the first aspect of the present invention will depend upon the length of the aluminium extrusions being transferred. Also, in order to ensure that the extrusions are laid correctly on the spacers, the conveyors will be retracted in sequence. In plan view the central or pair of central conveyors are first retracted followed by the pair of conveyors adjacent the central conveyor(s) and then in sequence until the two outermost conveyors are finally retracted. Such arrangement ensures that these profiles do not topple off the conveyor but are in fact correctly positioned on the spacers in the skip. After all of the conveyors have been retracted the height of the stack of profiles is then dropped into position to allow the next layer of profiles to be located on the skip.

Operation of the transfer apparatus is effected as follows:

The skip is lowered by operation of the synchronized jacks 23. At the same time, roller 13 is moved to position 13' whereby contact is made with the extrusions 19' on the roller conveyor. Motor 12 is then operated to drive the conveyor. Once the extrusions 19' have been removed from the roller conveyor, the roller 13' is lowered to level 13. The length of the conveyor 11 is then extended by actuation of air cylinder 21. Photoelectric cell 24 indicates when the conveyor 11 has been extended to its desired position. A brake is then applied to stop movement of conveyor 11 and the height of the stack is raised to a level governed by the photoelectric cell 25. Once appropriate spacers have been inserted then the belt conveyor 11 is retracted by operation of the air cylinder 21. The sequence mentioned above is then repeated at regular intervals.

An mentioned above, a plurality of belt conveyors make up the transfer apparatus, the number of conveyors utilized depending upon the length of the cut extrusions. A suitable circuit is provided for arranging for retraction of the plurality of conveyors in a staggered manner so as to ensure that the extrusions are correctly laid on the spacers in the skip. In the case of seven conveyors, the central conveyor would be retracted first followed by the two conveyors adjacent thereto and then followed by the next two outer conveyors and finally the two outermost conveyors. If the conveyors are not retracted in a staggered manner then the extrusions would tend to topple into the skip rather than be laid in the desired manner.

It can be thus seen that the device illustrated in FIGS. 1 and 2 provides an arrangement for automatically transferring aluminium extrusions from a roller conveyor on which they have been cut into a preselected length to a skip in which they will be subject to subsequent treatment, e.g., anodizing, such transfer apparatus obviating the need for any handling of the extrusions by the operator(s). The arrangement of an extendible and retractable conveyor means enables the extrusions to be located above the skip and then correctly placed therein in an economical manner.

The spacers can be either manually applied on top of each layer of stacked extrusions or mechanically applied. The apparatus illustrated in FIG. 3 shows an arrangement which may be utilized wherein the spacers are produced from a reel of cardboard 31. As illustrated in FIG. 3, the apparatus disclosed firstly scores the cardboard at 32 and then same is passed through a folder 33 and then through a creaser 34 whereby the cardboard is firstly folded and then creased and is then cut off into desired lengths at 35. It is to be noted that the apparatus has converted a flat layer of cardboard into a section of cardboard having height suitable for use as a spacer. As illustrated in FIG. 3a, the cardboard is flat as shown at A on leaving reel 31, it is then scored at 32 to shape B, is folded at 33 to shape c, is creased at 34 and is cut at 35 into desired lengths of shape E.

FIG. 3 also indicates the various operations which can be utilized in accordance with the present invention and the spacers when prepared can be inserted above the layers of stacked extrusions as required.

Whilst the apparatus of FIG. 3 has been illustrated in combination with the article transfer apparatus of the present invention, it is to be understood that such apparatus may be used with any other type of arrangement wherein spacer members are required.

It is to be understood that whilst the first aspect of the present invention has been described with reference to the specific arrangements disclosed in FIGS. 1 and 2 of the drawings, it is possible for the various integers illustrated to be replaced by equivalent means. For example, the belt conveyor arrangement could be replaced by roller or chain conveyors. Also, any appropriate means can be utilized for extending the length of the conveyor in the direction of conveyance.

It will thus be seen that the first aspect of the present invention provides an economic solution to the problem of transferring articles from one station to another. It will be readily appreciated that the transfer apparatus as described in relation to transfer of extruded aluminium sections may also be utilized for transfer of other articles from one station to another. Furthermore, the arrangement illustrated in FIGS. 1 and 2, can also be utilized for the packing of extrusions into a container for transport to a customer.

The apparatus illustrated in FIG. 4 only shows a single first conveyor 41 which is in the form of an endless belt and a single second conveyor 44 also in the form of an endless belt.

Furthermore, only one pair of support members 48, 48' are illustrated. It is to be understood that a plurality of each of the conveyors and a corresponding plurality of pairs of support members are utilized in the transfer apparatus of the present invention as illustrated in FIG. 5. In accordance with the normal length of profiles dealt with, there will be between 5 and 9 first conveyors, 5 and 9 second conveyors and 5 and 9 pairs of support members. It is to be understood that the pairs of support members will be offset relative to the plurality of second conveyors so that when the second conveyors are located over the skip the pairs of support members may move upwardly therebetween.

As illustrated in FIGS. 4 and 5, each first belt conveyor 41 is located between the rollers of a roller conveyor on which extruded aluminium profiles 42 have been cut to length. By upward displacement of the belt conveyor 41, the profiles 42 are transferred from the roller conveyor 43 onto the conveyor 41. By operation of the belt conveyor 41, the profiles are transferred to the second conveyor 44. By suitable operation of the conveyor 44 the profiles will be transferred to the end region 45 of the conveyor 44. When the profiles are in the desired position, operation of the conveyor 44 is stopped. By use of appropriate means 46, the belt conveyor 44 is moved from the position illustrated in dotted lines to that in which the end region 45 at least thereof is located above the skip 47 as shown in full lines in FIGS. 4 and 5.

Associated with the skip are a plurality of pairs of support members 48, 48'. A single support member 48 is shown in FIG. 6. The support member 48 consists of a slider 50, one end of which supports a spacer 49, the other end of which is connected to a U-shaped bracket 51. The U-shaped bracket is pivotally connected to a piston 52. In the embodiment shown, the piston can move laterally within a pneumatic cylinder 53 which is controlled through supply lines 54 and 55. However, it is understood that the inward and outward movement of the slider 50 can be performed by any suitable means. The support member 48 is mounted on a post 56, and is capable of vertical movement thereon, which is actuated by any known means.

The support members 48, 48' operate as follows:

A spacer 49 is placed between each pair of sliders 50. When the belt conveyor 44 is located above the skip 47, movement thereof is stopped. The support members 48, 48' together with the associated spaces 49 move upwardly and lift the extruded aluminium profiles 42 off the conveyor 44. Each conveyor 44 is then moved back to its original position shown in full lines. Assuming that the skip 47 is open-sided, then the pairs of support members 48, 48' and the associated spacers 49 having extruded profiles 42 thereon move downwardly until they either contact the base of the skip 47 or a plurality of previously deposited profiles 42. Once such a position is reached, each piston 52 is caused to move outwardly in its respective cylinder 53, thereby causing each slider 50 to move outwardly. When the ends of the sliders move past the ends of the spacers, the fresh set of profiles fully rests on the previously stacked profiles, and is spaced therefrom by the spacers 49. The support 48, 48' are then moved upwardly to their original position, and the sliders 50 are brought to their original position through the operation of cylinders 53 and pistons 52. A fresh set of spacers 49 are then located on the sliders, and the operation is repeated as desired until the skip 47 is filled.

It can thus be seen that the following operations are carried out:

1. The profiles are transferred from the roller conveyor by the first conveyors to the second conveyors.
2. The belts of the second conveyors move the profiles to the desired position.
3. The belts then stop.
4. The second conveyors are moved until the profiles located on the conveyors are located over the skip.
5. The skip support members having spacers resting of the associated sliders move upwardly and lift the profiles off the belt.
6. The belts then return to their original position.
7. The skip side support members move downwardly until in the desired position.
8. The sliders then retract.
9. The side support members move upwardly and the sliders move inwardly.
10. Fresh spacer members are inserted and the operation is repeated.

It is noted with a skip having closed sides that it will not be possible for the side support members to move downwardly. In such case the side members will operate as illustrated in FIGS. 4 and 5 in that they move upwardly until they contact the profiles are lifted off such conveyors then the conveyors are returned to their original position. Thereafter lifting means located within the skip are upwardly until they contact the spacers. The side support members then retract and the lifting means then moves downwardly. The side support members thereafter return to their original position.

Operation of the various integers can be by means of any suitable mechanical or electrical means.

It is to be understood that the various integers referred to in FIGS. 4 and 5 can be replaced by equivalent means. Also, it is possible for automatic means to be provided to feed the spacers between the side support members.

We claim:

1. An apparatus for transferring articles from a first station having a roller conveyor to a second station comprising:
- a plurality of first conveyors located between the rollers of said roller conveyor of said first station;
- a plurality of second conveyors that can move from a first position wherein said plurality of second conveyors can receive articles to be transferred from said plurality of first conveyors to a second position located above said second station, said second station containing an item into which said articles can be stacked, each of said plurality of second conveyors being associated with motor means; and
- a plurality of pairs of support members, each pair of support members, in use, having a spacer supported therebetween, said support members, in use, being moved upwardly so that the spacer associated therewith comes into contact with said articles, and in which, once said articles have lifted above the level of said plurality of second conveyors, said plurality of second conveyors are moved in the reverse direction to their original position, said support members thereafter being moved downwardly so that said spacer and articles move downwardly therewith, whereby, when said spacer contacts said item or a layer of articles already stacked, movement of said support members is stopped, said support members then moving downwardly thereafter so that the spacer associated therewith becomes disengaged therefrom and said articles are correctly stacked, said support members thereafter being moved upwardly and inwardly to their original position for the next set of articles to be supplied from said plurality of second conveyors.

* * * * *